US 10,859,897 B2

(12) United States Patent
Chen et al.

(10) Patent No.: US 10,859,897 B2
(45) Date of Patent: Dec. 8, 2020

(54) PROJECTION DEVICE

(71) Applicant: Coretronic Corporation, Hsin-Chu (TW)

(72) Inventors: Yi-Chang Chen, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/679,320

(22) Filed: Nov. 11, 2019

(65) Prior Publication Data

US 2020/0159095 A1    May 21, 2020

(30) Foreign Application Priority Data

Nov. 20, 2018  (CN) .......................... 2018 1 1383287

(51) Int. Cl.
G03B 21/14   (2006.01)
G03B 21/20   (2006.01)
G03B 21/16   (2006.01)

(52) U.S. Cl.
CPC ........... G03B 21/145 (2013.01); G03B 21/16 (2013.01); G03B 21/204 (2013.01)

(58) Field of Classification Search
CPC ...... G03B 21/14; G03B 21/16; G03B 21/145; G03B 21/204; H04N 9/3141; H04N 9/3144; H04N 9/3152
See application file for complete search history.

(56) References Cited

U.S. PATENT DOCUMENTS

2008/0055563 A1* 3/2008 Momose ................ G03B 21/16
                                                     353/61
2009/0141249 A1* 6/2009 Yanagisawa ........... G03B 21/16
                                                     353/61

FOREIGN PATENT DOCUMENTS

CN    204230850 U    3/2015
CN    205105495 U    3/2016

* cited by examiner

Primary Examiner — Sultan Chowdhury

(57) ABSTRACT

A projection device includes a light source module for emitting an illumination beam, an optical engine module for receiving the illumination beam and forming an image beam, and a projection lens for receiving and projecting the image beam to an outside of the projection device. The optical engine module includes first and second shells coupled in a first direction, an elastic sealing member and electronic components. The shells form an accommodation space in which the electronic components are disposed. The elastic sealing member has opposite first and second surfaces. The first surface has an engagement groove in which a portion of the first shell is engaged. The second shell abuts against the second surface. Signal transmission components of the electronic components are disposed through the elastic sealing member to pass through the shells.

12 Claims, 7 Drawing Sheets

PROJECTION DEVICE

CROSS-REFERENCE TO RELATED APPLICATION

This application claims the priority benefit of China application (CN201811383287.5), filed on 2018 Nov. 20. The entirety of the above-mentioned patent application is hereby incorporated by reference herein and made a part of this specification.

FIELD OF THE INVENTION

The invention relates to a display device, and more particularly to a projection device.

BACKGROUND OF THE INVENTION

A projection device processes an illumination beam provided by a light source into an image beam by an optical engine module, and then the image beam is projected onto a screen by a projection lens to form an image on the screen. The optical engine module includes a plurality of optical elements. In order to prevent dust from contaminating the optical elements and affecting the display quality, the optical elements are usually covered with a dust-proof housing inside the projection device.

Since the electronic components of the optical engine module are also covered in the dust-proof housing, the top wall of the dust-proof housing needs to be provided with openings for the transmission lines of electronic components to pass to an outside of the dust-proof housing. Furthermore, sealing the opening with a rubber piece to prevent dust from entering the dust-proof housing is necessary. Therefore, the conventional projection device takes a lot of time to assemble. If it is to be imported into an automated production facility, it is also necessary to add complex clamps and robotic arms, resulting in high cost.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device to improve assembly efficiency.

Other advantages and objects of the invention may be further illustrated by the technical features broadly embodied and described as follows.

In order to achieve one or a portion of or all of the objects or other objects, an embodiment of the invention provides a light source module, an optical engine module, and a projection lens. The light source module is used for emitting an illumination beam. The optical engine module is disposed on a transmission path of the illumination beam and used for receiving an illumination beam and forming an image beam. The optical engine module includes a first shell, a second shell, an elastic sealing member, and electronic components. The second shell and the first shell are coupled to each other in the first direction to form an accommodation space. The elastic sealing member is disposed between the first shell and the second shell for sealing the junction of the first shell and the second shell. The elastic sealing member has an opposite first surface and a second surface, wherein the first surface faces the first shell and the second surface faces the second shell. The first surface has an engagement groove. A portion of the first shell is engaged in the engagement groove. The second shell abuts against the second surface. At least one electronic component is disposed in the accommodation space and each of the at least one electronic component has a signal transmission component. The signal transmission component is disposed through the elastic sealing member to pass to the outside of the first shell and the second shell. The projection lens is disposed on the transmission path of the image beam and is used for receiving the image beam and projecting the image beam to an outside of the projection device.

In the projection device of the embodiments of the invention, the signal transmission component of the electronic component passes to the outside of the first shell and the second shell of the optical engine module via an elastic sealing member between the first shell and the second shell. Therefore, compared to the conventional technology in which a rubber member is additionally required to seal the opening from which the transmission line passes through, the projection device of the embodiments of the invention can simplify the process of assembly and improve assembly efficiency. Moreover, because the process of assembly of the embodiments of the invention is relatively simpler, the cost of automation equipment can be reduced if automated production is to be performed.

In the projection device of the embodiments of the invention, the first surface of the elastic sealing member has an engagement groove, and a portion of the first shell is engaged in the engagement groove to increase the sealing property of the junction between the first shell and the second shell, thereby improving dust-proof effect.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
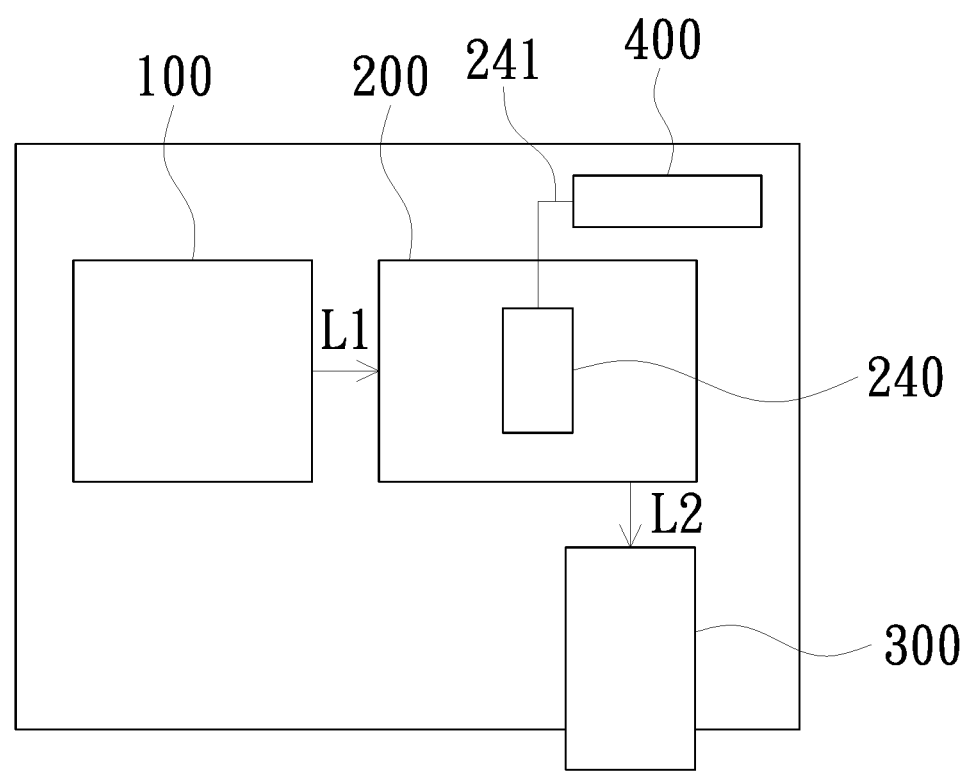
FIG. 1 is a schematic block diagram of a projection device according to an embodiment of the invention.

FIG. 1 is a schematic block diagram of a projection device according to an embodiment of the invention. Please refer to FIG. 1. A projection device 10 of the embodiment includes a light source module 100, an optical engine module 200 and a projection lens 300. The light source module 100 is used for emitting an illumination beam L1. The optical engine module 200 is disposed on a transmission path of the illumination beam L1, and the optical engine module 200 can be used for receiving the illumination beam L1 and forming an image beam L2. The projection lens 300 is disposed on a transmission path of the image beam L2, and can be used for receiving the image beam L2 and projecting the image beam L2 to the outside of the projection device 10, for example, projecting the image beam L2 to the screen to form an image on the screen.

The light source module 100 may include a light bulb (such as a halogen bulb, a high pressure mercury lamp, etc.), and the generated illumination beam L1 may be white light. The light source module 100 may also include a light emitting diode (LED) light source, and the generated illumination beam L1 may be composed of red, blue, and green light. The light source module 100 may also include a laser source, and the generated illumination beam L1 may be blue light. Further, the light source module 100 may also be other types of light sources.

The optical engine module 200 includes a light valve (not shown in figure) for forming the image beam L2. The light valve may be a reflective light valve or a transmissive light valve, wherein the reflective light valve may be a digital micro-mirror device (DMD) or a liquid crystal on silicon panel (LPOS panel), and the transmissive light valve may be a transmissive liquid crystal panel, but is not limited thereto.

The optical engine module 200 further includes at least one electronic component 240 (only illustrated in FIG. 1 by one), and the electronic component 240 has a signal transmission component 241. The projection device 10 further includes, for example, a motherboard 400 disposed outside the optical engine module 200. The motherboard 400 is electrically connected to the electronic component 240 by the signal transmission component 241. The motherboard 400 can be used for controlling the electronic component 240 or receiving electrical signals provided by the electronic component 240. The signal transmission component 241 may be a transmission line, a flexible printed circuit, or the like, but is not limited thereto.

The projection lens 300 includes, for example, a combination of one or more optical lenses having diopter, such as including various combinations of non-planar lenses including biconcave lenses, biconvex lenses, concave-convex lenses, convex-concave lenses, plano-convex lenses, and plano-concave lenses. In an embodiment, projection lens 300 may also include planar optical lenses. The invention does not limit the type and configuration of the projection lens 300.

Figure 2A:
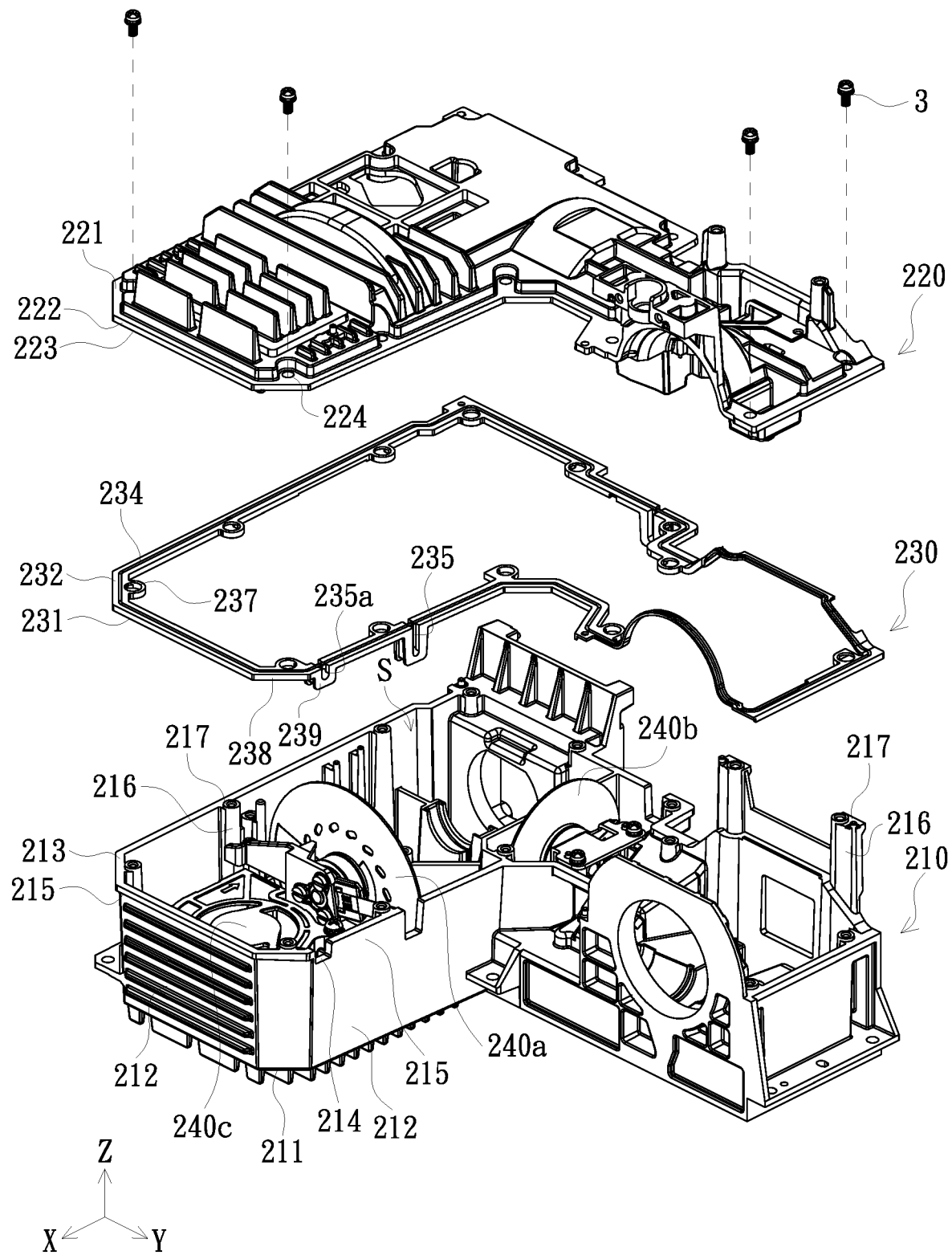
FIG. 2A is a schematic exploded view of a first shell, a second shell and an elastic sealing member of an optical engine module according to an embodiment of the invention.
Figure 2B:
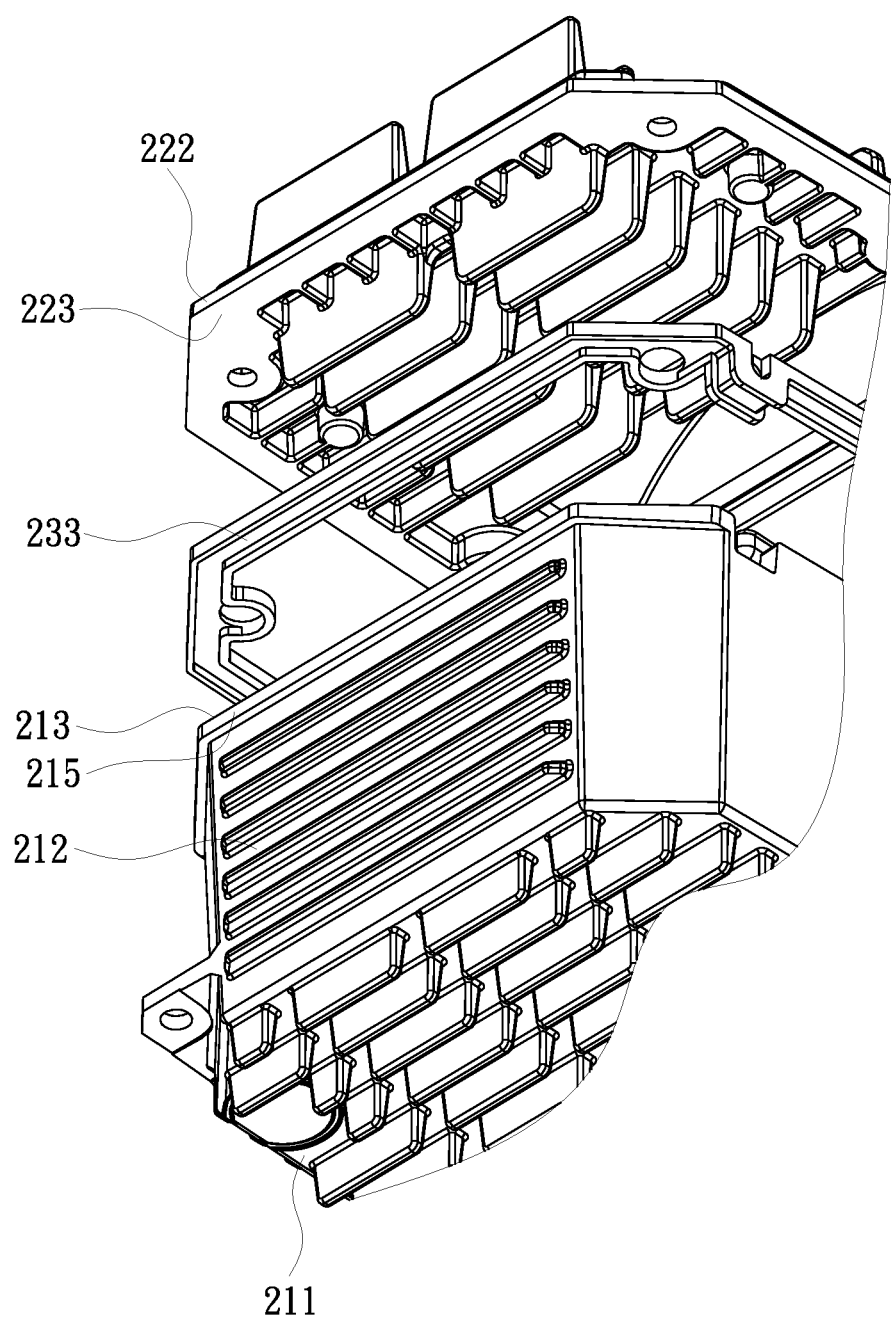
FIG. 2B is a schematic partial enlarged exploded view of a first shell, a second shell and an elastic sealing member according to an embodiment of the invention.
Figure 2C:
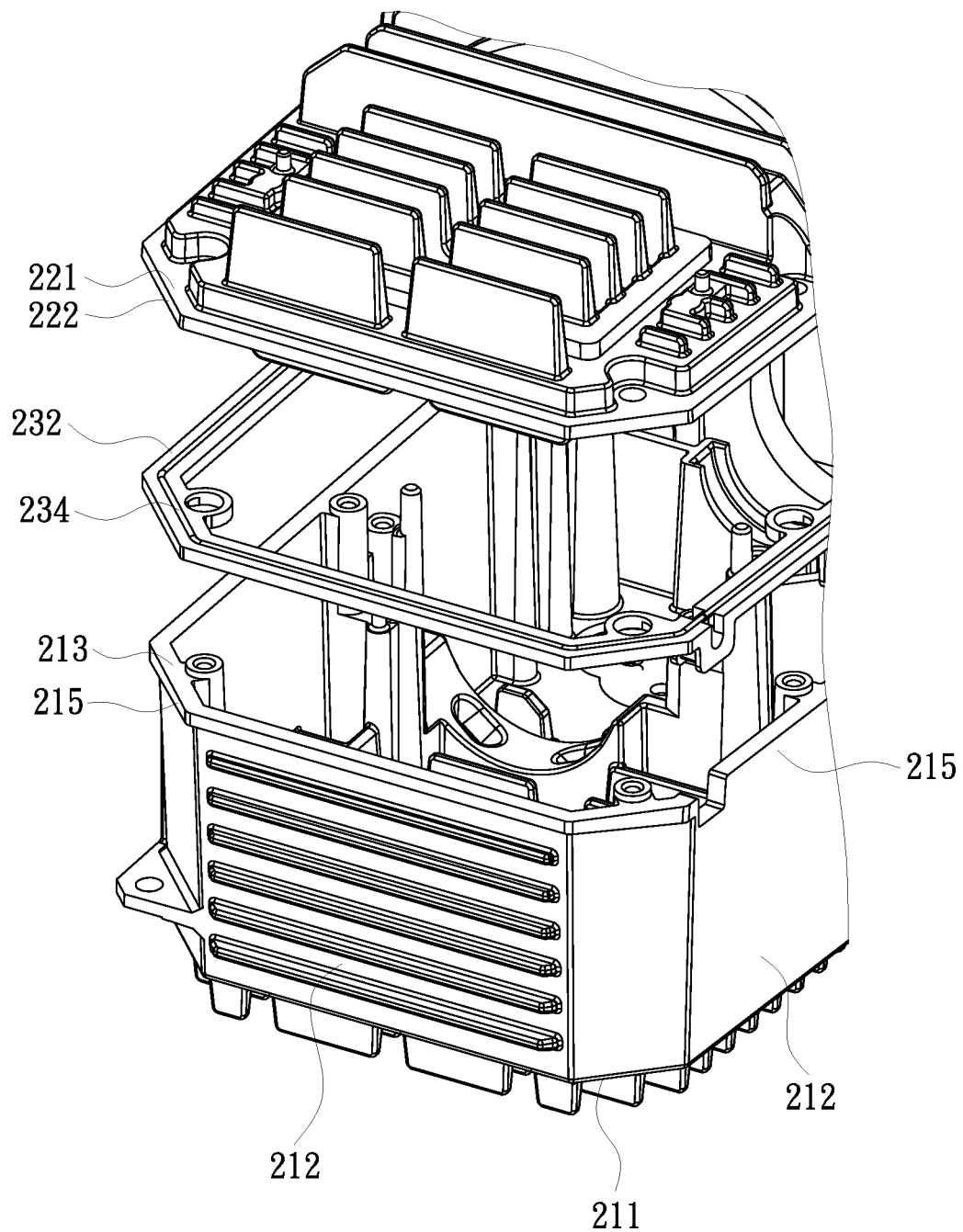
FIG. 2C is a schematic partial enlarged exploded view of a first shell, a second shell and an elastic sealing member according to an embodiment of the invention.

FIG. 2A is a schematic exploded view of a first shell, a second shell, and an elastic sealing member of an optical engine module according to an embodiment of the invention, and FIG. 2B and FIG. 2C are schematic partial enlarged exploded views of a first shell, a second shell, and an elastic sealing member at different angles according to an embodiment of the invention. Please refer to FIG. 2A, FIG. 2B and FIG. 2C. The optical engine module 200 further includes a first shell 210, a second shell 220, and an elastic sealing member 230. The second shell 220 and the first shell 210 are coupled to each other in a first direction (e.g. a Z-axis direction) to form an accommodation space S. In this embodiment, the optical engine module 200 receives the illumination beam L1 from the light source module 100, the light source module 100 is, for example, a laser light source, and the generated illumination beam L1 may be a blue laser. The optical engine module 200 further includes a plurality of electronic components 240. For example, the optical engine module 200 may include: a wheel for dividing the illumination beam L1 into different colors according to time sequences, such as a filter wheel or a wavelength conversion wheel; a wheel detection element for detecting the rotation of the wheel; an actuator capable of causing the speckles of the illumination beam L1 to be projected onto the light valve to move a distance at half a pixel to enhance image resolution; and a fan for dissipating heat from the electronic components. The electronic component 240 in FIG. 1 is disposed in the accommodation space S. The electronic component 240 in FIG. 1 may include electronic components such as a wavelength conversion wheel 240a, a filter wheel 240b and a fan 240c illustrated in FIG. 2A and may also include the wheel detection elements, the actuators and the other electronic components not shown. The elastic sealing member 230 has a first surface 231 and a second surface 232 opposite to each other, wherein the first shell 210 abuts against the first surface 231 and the second shell 220 abuts against the second surface 232.

The first surface 231 of the elastic sealing member 230 has an engagement groove 233 disposed along a junction of the first shell 210 and the second shell 220. A portion of the first shell 210 is engaged in the engagement groove 233. Specifically, the first shell 210 has a first bottom wall 211 and a plurality of first side walls 212 surrounding and connected to the first bottom wall 211. The first side wall 212 has a first top surface 213 facing the first surface 231 and a plurality of first side surfaces 215 connected to the first top surface 213. The first top surface 213 and a portion of the first side surface 215 adjacent to the first top surface 213 abut against the engagement groove 233. In this embodiment, a junction surface of the second shell 220 and the first shell 210 is, for example, an X-Y plane, and the first direction is, for example, perpendicular to the X-Y plane. Further, the elastic sealing member 230 is disposed between the first shell 210 and the second shell 220 for sealing the junction of the first shell 210 and the second shell 220. As viewed in a top view angle in the first direction, the electronic components, including the wavelength conversion wheel 240a, the filter wheel 240b, the fan 240c, etc., are located in the area surrounded by the elastic sealing member 230. In addition, the material of the elastic sealing member 230 may include rubber or other elastic material.

In order to improve the tightness of the junction between the first shell 210 and the second shell 220, the second surface 232 of the elastic sealing member 230 may have a protruding portion 234 disposed along the junction of the first shell 210 and second shell 220. The second shell 220 may have a second bottom wall 221 and a second side wall 222 connected to and surrounding the second bottom wall 221. The second sidewall 222 has a second top surface 223 facing the second surface 232 and abutting against the protruding portion 234. The protruding portion 234 can enhance the tightness between the second top surface 223 and the second surface 232.

Referring again to FIG. 2A, at least one of the first top surface 213 of the first side walls 212 of the first shell 210 which faces the second shell 220 has at least one groove 214. In other words, each of the first top surfaces 213 of the first side walls 212 may be provided with one or more grooves 214 as needed, and some of the first top surfaces 213 of the first side walls 212 may not be provided with groove 214. The groove 214 is used for allowing a signal transmission component (not shown in figure) of the electronic component such as the wavelength conversion wheel 240a, the filter wheel 240b, and the fan 240c, etc. to pass to the outside of the first shell 210 and the second shell 220. The number and position of the grooves 214 are matched with the number and position of the electronic components, but the number of grooves 214 and the number of the electronic components are not limited to one-to-one. Further, the elastic sealing member 230 has, for example, a sealing strip 238 and at least one sealing block 239. The sealing strip 238 seals the junction of the first shell 210 and the second shell 220. The contour of the sealing strip 238 corresponds to the contour of the junction of the first shell 210 and the second shell 220. Each sealing block 239 is formed by extending from the sealing strip 238 in the first direction, and the sealing block 239 corresponds to the groove 214. That is, an external force can be applied to secure the sealing block 239 in the groove 214 in the first direction.

The first shell 210 may further have a plurality of fixing columns 216 connected to the first side wall 212. Each fixing column 216 has fixing hole 217. The second shell 220 has a plurality of through holes 224 corresponding to the fixing holes 217. The elastic sealing member 230 further has a plurality of set rings 237 connected to the sealing strip 238 and sleeved on the fixing columns 216. The projection device of the embodiment may further include a plurality of fixing members 3 deposed to pass through the through holes 224 and the fixing holes 217 to fix the first shell 210 and the second shell 220. In this embodiment, the fixing hole 217 may have an internal thread, the fixing member 3 may be a screw having an external thread, and the external thread of the fixing member 3 corresponds to the internal thread of the fixing hole 217. The fixing members 3, the fixing columns 216 and the set rings 237 may have the same amount. However, in FIG. 2A, in order to clearly show all the structures, it is indicated by the four fixing members 3. However, the fixing mechanism between the first shell 210 and the second shell 220 is not limited to the embodiment. The plurality of fixing columns may also be disposed on the second shell 220, and when the fixing columns are deposited on one of the first shell 210 or the second shell 220, corresponding fixing holes may be deposited on another. In addition, a portion of a plurality of fixing columns may be disposed on the first shell 210, the other portion is disposed on the second shell 220, and the fixing holes can be distributed corresponding to the fixing columns to achieve the above fixing function.

Figure 3:
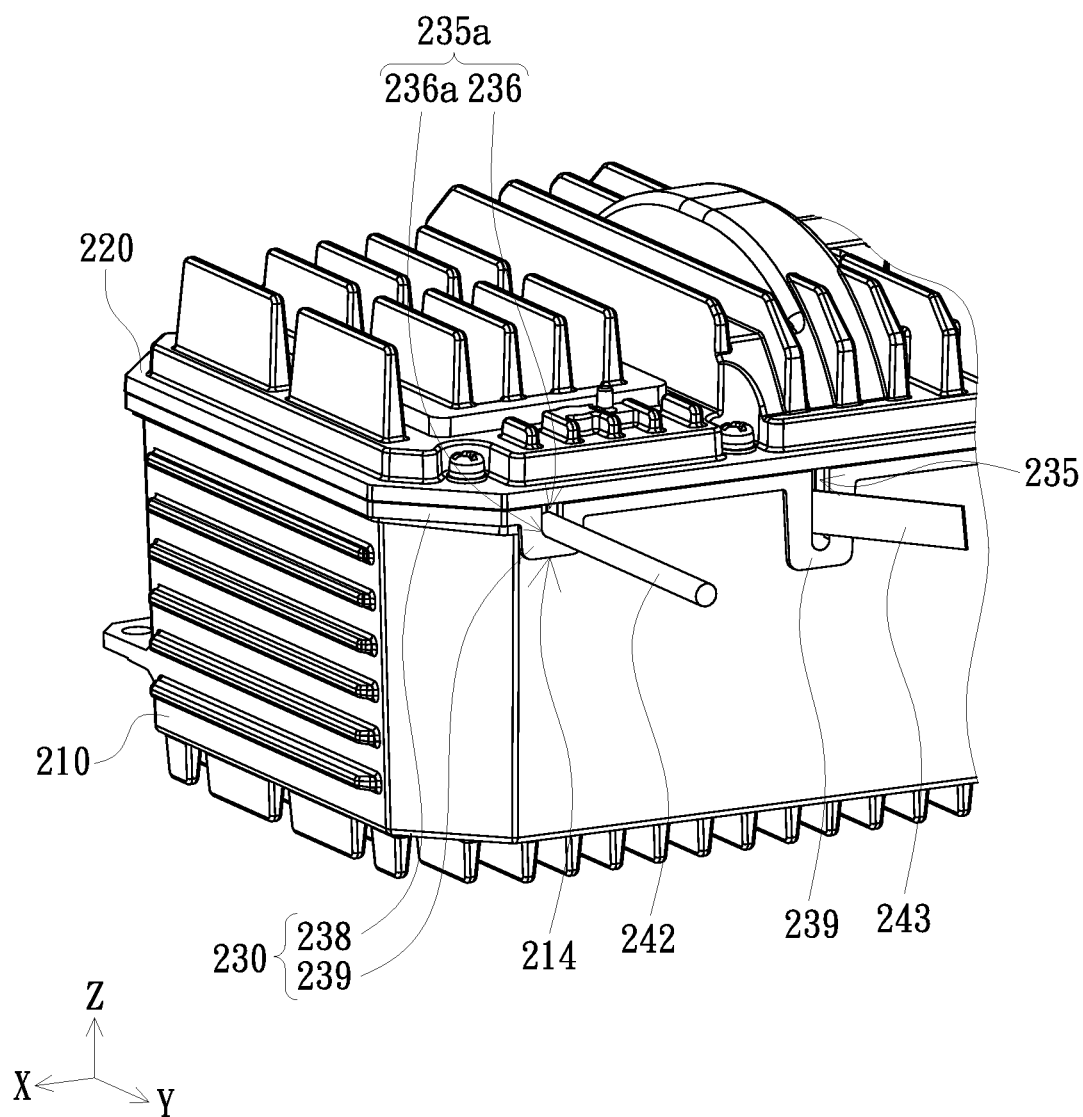
FIG. 3 is a schematic diagram of the signal transmission components of the electronic components passing to the outside of the first shell and the second shell according to an embodiment of the invention.

FIG. 3 is a schematic diagram of a signal transmission component of an electronic component passing to an outside of a first shell and a second shell according to an embodiment of the invention. Referring to FIG. 1, FIG. 2A and FIG. 3, the signal transmission component 241 of the electronic component 240 in FIG. 1, that is, the electronic component such as the wavelength conversion wheel 240a, the filter wheel 240b, the fan 240c and etc. in FIG. 2A, may include a first signal transmission component 242 and a second signal transmission component 243, wherein the first signal transmission component 242 can be a transmission line, and the second signal transmission component 243 can be a flexible printed circuit (FPC). The first signal transmission component 242 and the second signal transmission component 243 may be disposed to pass through the elastic sealing member 230 to pass to the outside of the first shell 210 and the second shell 220. In other embodiment, the first signal transmission component 242 or the second signal transmission component 243 may pass through from an inside of the accommodation space S to the outside of the accommodation space S via the elastic sealing member 230. In other, Specifically, one ends of the first signal transmission component 242 and the second signal transmission component 243 are located in the accommodation space S and electrically connected to the electronic component such as wavelength conversion wheel 240a, filter wheel 240b, the fan 240c and etc, and the other ends pass through the elastic sealing member 230 and are located outside the first shell 210 and the second shell 220, so that the first signal transmission component 242 and the second signal transmission component 243 can be connected to the motherboard 400 in FIG. 1. The first signal transmission component 242 and the second signal transmission component 243 are disposed to pass through the elastic sealing member 230 in the second direction, and the second direction is, for example, perpendicular to the first direction. For example, the second direction may include an X-axis direction, a Y-axis direction, and other directions parallel to the X-Y plane, but the invention is not limited thereto.

The elastic sealing member 230 in the embodiment further has, for example, at least one trench 235, and each trench 235 extends from the sealing strip 231 in the first direction into the corresponding sealing block 239. The trench 235 can be, for example, a straight trench. The second signal transmission member 243 as being a flexible printed circuit can enter the trench 235 in the first direction. The elastic sealing member 230 in this embodiment may further have at least one trench 235a. The trench 235a may include a straight trench 236 and an accommodation hole 236a. The straight trench 236 extends from the sealing strip 238 to the corresponding sealing block 239 in the first direction. The accommodation hole 236a is located in the corresponding sealing block 239 and communicates with the straight trench 236. The first signal transmission component 242 as being a transmission line, may enter and be received in the corresponding accommodation hole 236a via the corresponding straight trench 236 in the first direction. That is, before coupling the first shell 210 and the second shell 220, an external force may be first applied to the first signal transmission component 242 to secure to the accommodation hole 236a through the straight trench 236 from up to down in the first direction and to the second signal transmission component 243 to secure to the trench 235 with a straight trench form up to down in the first direction, and then a coupling is performed between the first shell 210 and the second shell 220. In addition, for the trench 235a, the maximum width of the accommodation hole 236a is, for example, greater than the maximum width of the corresponding straight trench 236, and the diameter of the accommodation hole 236a is, for example, matched to the diameter of the signal transmission component 242, so as to avoid an excessive gap between the first signal transmission member 242 and the hole wall of the accommodation hole 236a. In addition, since the maximum width of the straight trench 236 is smaller than the maximum width of the accommodation hole 236a, there is less possibility of dust entering the interior of the optical engine module 200 from the straight trench 236. In addition, after the first shell 210 is coupled with the second shell 220, the gap between the trench 235 or the trench 235a may be glued to further reduce the possibility of dust entering the optical engine module 200.

In the projection device 10 of the embodiment of the invention, the signal transmission component 241 of the electronic component 240 passes to the outside of the first shell 210 and the second shell 220 of the optical engine module 200 via the elastic sealing member 230 between the first shell 210 and the second shell 220. As compared with the prior art in which a rubber member is further required to seal the opening for the transmission line to pass therethrough, the projection device 10 of the embodiment of the invention can simplify the assembly process and improve the assembly efficiency. Moreover, because the assembly process is relatively simple, the invention can reduce the cost of automation equipment if automated production is applied.

In the projection device 10 of the embodiment of the invention, the first surface 231 of the elastic sealing member 230 has an engagement groove 233, and a portion of the first shell 210 is engaged in the engagement groove 233 to increase the tightness of the junction between the first shell 210 and the second shell 220, thereby improving dust-proof effect.

In the projection device 10 of the embodiment of the invention, the second surface 232 of the elastic sealing member 230 has a protruding portion 234, which can effectively improves the tightness between the second shell 220 and the elastic sealing member 230, thereby further improving the dust-proof effect.

Figure 4A:
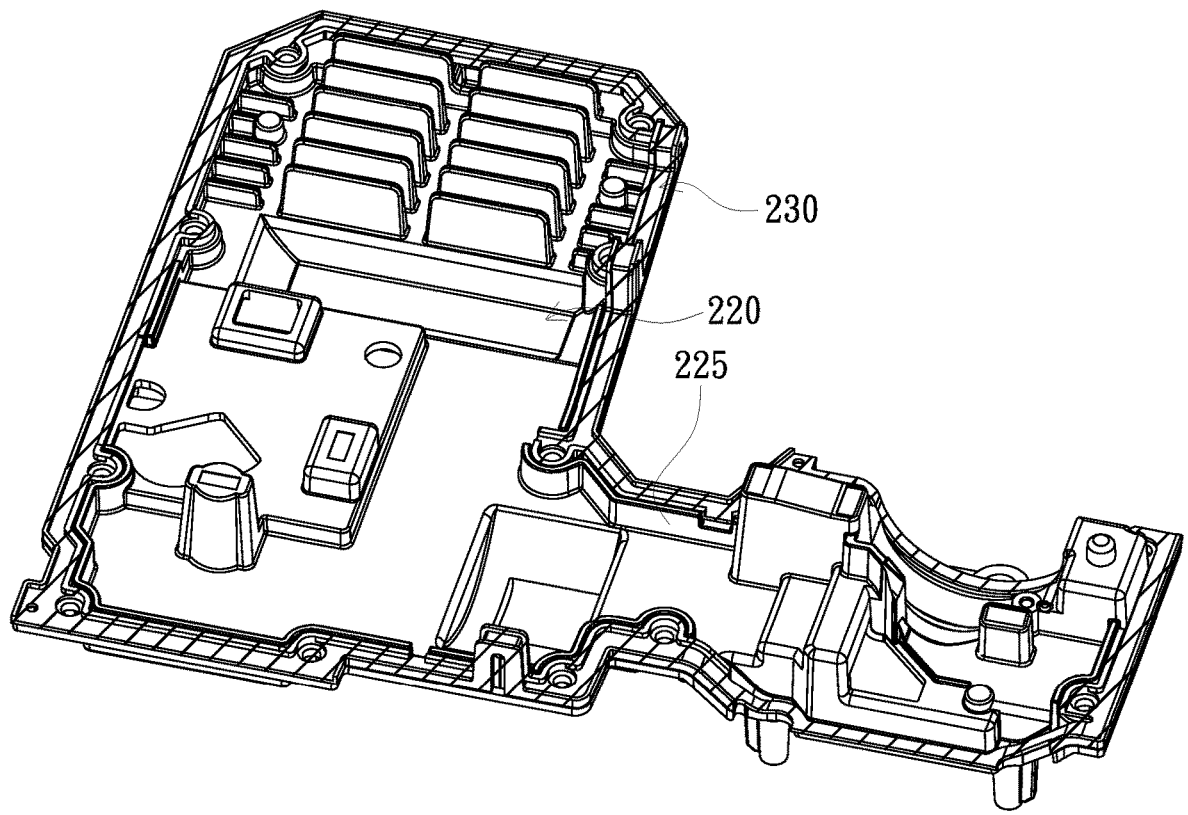
FIG. 4A is a schematic diagram of second shell having a side retaining wall according to an embodiment of the invention.
Figure 4B:
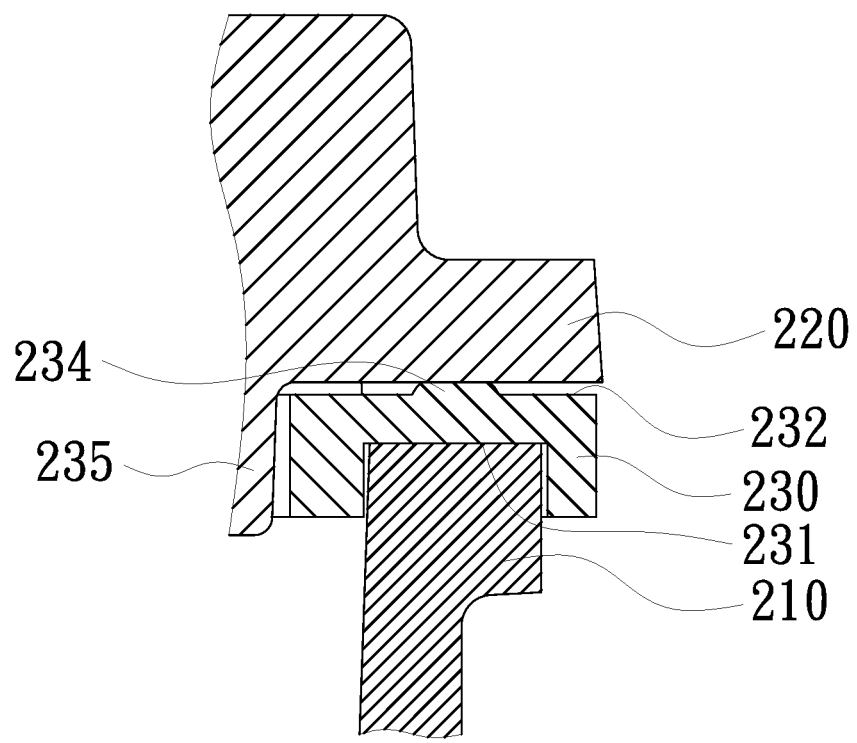
FIG. 4B is a schematic cross-sectional diagram of combination of a first shell, a second shell, and an elastic sealing member of an optical engine module according to an embodiment of the invention.

FIG. 4A is a schematic diagram of a second shell having a side retaining wall according to another embodiment of the invention. FIG. 4B is a cross-sectional schematic diagram of a first shell, a second shell, and an elastic sealing member of an optical engine module assembled in a first direction according to another embodiment of the invention. Referring to FIG. 1, FIG. 4A and FIG. 4B, the second shell 220 may further has a side retaining wall 225 which may be distributed along all or part of the elastic sealing members 230 to block the direct illumination of the light from the optical engine module 200 to the elastic sealing member thereby preventing the elastic sealing member 230 from generating volatile substances. However, the side retaining wall 225 is not limited to be disposed on the second shell 220 and may be disposed on the first shell 210. Same as the previous embodiment, the first surface 231 of the elastic sealing member 230 is abutted against by the first shell 210, and the second surface 232 is abutted against by the second shell 220. By engaging a portion of the first shell 210 into the engagement groove 233 and abutting the second shell 220 against the protruding portion 234 of the second surface 232, the elastic sealing member 230 can well seal the junction of the first shell 210 and the second shell 220, thereby having a high effective dust-proof consequence.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first shell, the second shell, the first direction, the second direction, the first surface, the second surface, the first bottom wall, the second bottom wall, the first side wall, the second side wall, the first top surface, the second top surface, the first signal transmission component, the second signal transmission component are only used for distinguishing various elements and do not limit the number of the elements.

What is claimed is:

1. A projection device, comprising: a light source module, used for emitting an illumination beam; an optical engine module, disposed on a transmission path of the illumination beam and used for receiving the illumination beam and forming an image beam, and the optical engine module comprising: a first shell; a second shell, wherein the second shell and the first shell are coupled to each other in a first direction to form an accommodation space; an elastic sealing member, disposed between the first shell and the second shell for sealing a junction of the first shell and the second shell, wherein the elastic sealing member has an opposite first surface and a second surface, the first surface faces the first shell, the second surface faces the second shell, the first surface has an engagement groove, a portion of the first shell is engaged in the engagement groove, and the second shell abuts against the second surface; at least one electronic component, disposed in the accommodation space, wherein each of the at least one electronic component has a signal transmission component, and the signal transmission component is disposed through the elastic sealing member to pass to an outside of the first shell and the second shell; and a projection lens, disposed on a transmission path of the image beam and used for receiving the image beam and projecting the image beam to an outside of the projection device.

2. The projection device according to claim 1, wherein the second surface has a protruding portion, and the second shell abuts against the protruding portion of the second surface.

3. The projection device according to claim 1, wherein the first shell has a first bottom wall and a first side wall, the first side wall is connected to and surrounding the first bottom wall, the first side wall has a first top surface facing the first surface and a plurality of first side surfaces connected to the first top surface, and the first top surface and a portion of the plurality of first side surfaces adjacent to the first top surface abuts against the engagement groove.

4. The projection device according to claim 3, wherein the first top surface of the first side wall has at least one groove, the elastic sealing member has a sealing strip and at least one sealing block, the sealing strip seals the junction of the first shell and the second shell and has the first surface and the second surface, the at least one sealing block is formed to extend from the sealing strip in the first direction, and the at least one sealing block corresponds to the at least one groove.

5. The projection device according to claim 4, wherein the elastic sealing member further has at least one trench, the at least one trench extends from the sealing strip in the first direction into the at least one sealing block, and the signal transmission component enters in the first direction and is received in the corresponding at least one trench.

6. The projection device according to claim 5, wherein the at least one trench each comprises a straight trench and an accommodation hole, the straight trench extends from the sealing strip in the first direction into the corresponding at least one sealing block, the accommodation hole is located in the corresponding at least one sealing block and communicates with the straight trench, and a maximum width of the accommodation hole is greater than a maximum width of the corresponding straight trench.

7. The projection device according to claim 4, wherein the second shell has a second bottom wall and a second side wall, the second side wall is connected to and surrounding the second bottom wall, the second side wall has a second top surface facing the second surface, at least one of the first shell and the second shell further has a plurality of fixing columns, the plurality of fixing columns is connected to at least one of the first side wall and the second side wall, each of the plurality of fixing columns has a fixing hole, the other of the at least one of the first shell and the second shell has a plurality of through holes corresponding to the plurality of fixing holes, the elastic sealing member further has a plurality of set rings connected to the sealing strip and sleeved on the plurality of fixing columns, and the projection device further comprises a plurality of fixing members disposed through the plurality of through holes and the plurality of fixing holes to fix the first shell and the second shell.

8. The projection device according to claim 1, wherein at least one of the first shell and the second shell has a side retaining wall, and the side retaining wall is distributed along the elastic sealing member to block light directly illuminating the elastic sealing member.

9. The projection device according to claim 1, wherein the at least one electronic component comprises at least one of a filter wheel, a wavelength conversion wheel, a wheel detection element, an actuator, and a fan.

10. The projection device according to claim 1, wherein the at least one electronic component is located in an area surrounded by the elastic sealing member.

11. The projection device according to claim 1, wherein the signal transmission component passes through the accommodation space from an inside of the accommodation space to the outside of the accommodation space via the elastic sealing member in a second direction, and the second direction is perpendicular to the first direction.

12. The projection device according to claim 1, further comprising a motherboard, wherein the signal transmission component of each of the at least one electronic component is electrically connected to the motherboard, and the motherboard is used for controlling the at least one electronic component or receiving an electrical signal provided by the at least one electronic component.

* * * * *